(12) United States Patent
Burton, Jr.

(10) Patent No.: US 7,837,978 B2
(45) Date of Patent: Nov. 23, 2010

(54) PROCESS FOR PREPARING ALUMINUM-CONTAINING MOLECULAR SIEVE SSZ-26

(75) Inventor: Allen W. Burton, Jr., Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 692 days.

(21) Appl. No.: 11/866,258

(22) Filed: Oct. 2, 2007

(65) Prior Publication Data

US 2008/0089835 A1    Apr. 17, 2008

Related U.S. Application Data

(60) Provisional application No. 60/829,390, filed on Oct. 13, 2006.

(51) Int. Cl.
*C01B 39/04* (2006.01)

(52) U.S. Cl. .................................. 423/706; 423/718

(58) Field of Classification Search ................. 423/704, 423/706, 718
See application file for complete search history.

(56) References Cited

U.S. PATENT DOCUMENTS

| | | | |
|---|---|---|---|
| 4,297,328 A | 10/1981 | Ritscher et al. | |
| 4,910,006 A | 3/1990 | Zones et al. | |
| 4,963,337 A | 10/1990 | Zones | |
| 5,078,979 A | 1/1992 | Dunne | |
| 5,225,179 A | 7/1993 | Nakagawa | |
| 5,965,104 A * | 10/1999 | Lee et al. | 423/706 |
| 6,080,382 A | 6/2000 | Lee et al. | |
| 7,390,395 B2 * | 6/2008 | Elomari | 208/108 |

OTHER PUBLICATIONS

Lee et al, "Organocation in Zeolite Synthesis: Fused Bicyclo [l.m.0] Cations and the Discovery of Zeolite SSZ-48", J.Am.Chem.Soc. (2002), 124, pp. 7024-7034.*
International Preliminary Report on Patentability for PCT/US2007/081114 mailed Apr. 23, 2009 (6 pages).

* cited by examiner

*Primary Examiner*—David M Brunsman
(74) *Attorney, Agent, or Firm*—Michael D. Ross; Richard Sheridan

(57) ABSTRACT

A process for directly preparing aluminum-containing molecular sieve SSZ-26 using a structure directing agent comprising a cis-N,N-diethyldecahydroquinolinium cation or mixture of a cis-N,N-diethyldecahydroquinolinium cation and a trans-N,N-diethyldecahydroquinolinium cation.

16 Claims, 1 Drawing Sheet

SSZ-26 calcined

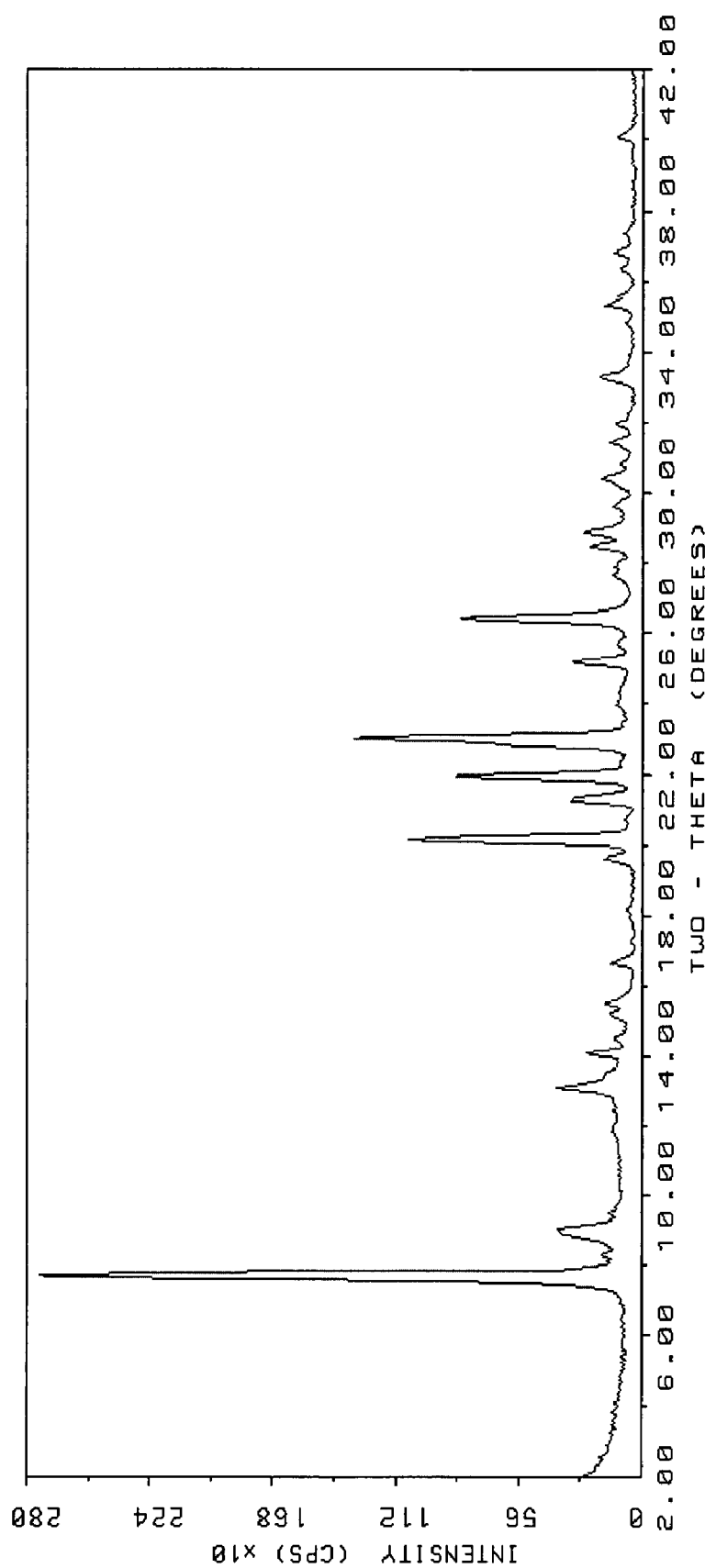

PROCESS FOR PREPARING ALUMINUM-CONTAINING MOLECULAR SIEVE SSZ-26

This application claims the benefit of provisional Application No. 60/829,390, filed Oct. 13, 2006.

FIELD OF THE INVENTION

A process for preparing aluminum-containing molecular sieve SSZ-26.

BACKGROUND OF THE INVENTION

U.S. Pat. No. 4,963,337, issued Oct. 16, 1990 to Zones, discloses a zeolite designated SSZ-33. SSZ-33 is a borosilicate material and is synthesized using a tricyclodecane quaternary ammonium ion structure directing agent ("SDA"). U.S. Pat. No. 4,910,006, issued Mar. 20, 1990 to Zones et al., discloses a zeolite designated SSZ-26. SSZ-26 does not require the presence of boron in its crystal framework, and can be an aluminosilicate. It is made using a hexamethyl [4.3.3.0]propellane-8,11-diammonium cation SDA.

SSZ-33 and SSZ-26 are members of the same series of intergrowth structures; they differ in the degree of intergrowth of the two polytype endmembers that comprise the intergrowth series. Therefore, all things being equal (i.e., heteroatom content and identity, crystallite size and morphology), the two materials should exhibit similar adsorption and catalytic behavior.

SSZ-26 can be made by first synthesizing the borosilicate SSZ-33. However, this requires a comparatively expensive SDA which requires a few steps of organic chemistry to synthesize. Once the SSZ-33 borosilicate is prepared and the SDA is removed by calcination, the framework boron must be replaced by aluminum if an aluminum-containing material is desired. To do this, the borosilicate is treated with concentrated solutions of aluminum salts. This extra step adds more cost in terms of time, chemicals, waste disposal (of the aluminum solutions), and heat treatments. Thus, a direct synthesis (i.e., one which does not require the borosilicate SSZ-33 precursor) of an aluminum-containing SSZ-26 would be preferred if a relatively inexpensive SDA could be used.

It has now been found that aluminum-containing molecular sieve SSZ-26 can be prepared directly (i.e., without having to first prepare a boron-containing molecular sieve followed by replacement of the boron with aluminum) using cis-N,N-diethyldecahydroquinolinium cation SDA.

SUMMARY OF THE INVENTION

There is provided a process for preparing aluminum-containing molecular sieve SSZ-26, said process comprising:

(a) preparing an aqueous suspension from (1) sources of an alkali metal oxide, alkaline earth metal oxide or mixtures thereof; (2) sources of an oxide selected from the oxides of aluminum, or mixtures of oxides of aluminum and iron, gallium, indium, and/or titanium; (3) sources of an oxide selected from oxides of silicon, germanium or mixtures thereof; and (4) cis-N,N-diethyldecahydroquinolinium cation SDA;

(b) maintaining the aqueous suspension under conditions sufficient to form crystals of the molecular sieve.

The present invention also provides an aluminum-containing molecular sieve SSZ-26 composition, as-synthesized and in the anhydrous state whose composition, in terms of mole ratios, is as follows:

| | |
|---|---|
| $YO_2/X_cO_d$ | greater than 15 |
| $Q/YO_2$ | 0.02-0.10 |
| $M_{2/n}/YO_2$ | 0.005-0.10 | wherein Y is silicon, germanium or a mixture thereof; X is aluminum or a mixture of aluminum and iron, gallium, indium, and/or titanium; c is 1 or 2, d is 2 when c is 1 or b is 3 or 5 when c is 2; Q is cis-N,N-diethyldecahydroquinolinium cation SDA; M is an alkali metal cation, alkaline earth metal cation or mixtures thereof; and n is the valence of M.

BRIEF DESCRIPTION OF THE DRAWING

The drawing is a powder X-ray diffraction pattern of calcined aluminum-containing SSZ-26.

DETAILED DESCRIPTION

The process for preparing aluminum-containing molecular sieve SSZ-26 comprises:

(a) preparing an aqueous suspension from sources of oxides capable of forming aluminum-containing molecular sieve SSZ-26 and cis-N,N-diethyldecahydroquinolinium cation SDA;

(b) maintaining the aqueous suspension under conditions sufficient to form crystals of the aluminum-containing molecular sieve SSZ-26.

As used herein, the term "aluminum-containing" means that the SSZ-26 has aluminum atoms in its crystal framework, as opposed to being merely on the surface of the crystal.

The process comprises forming a reaction mixture from sources of alkali and/or alkaline earth metal (M) cations with valences n (i.e., 1 of 2); sources of ah oxide of aluminum or mixtures of oxides of iron, gallium, indium and/or titanium (X); sources of an oxide of silicon, germanium or mixtures thereof (Y); cis-N,N-diethyldecahydroquinolinium cation SDA (Q); and water, said reaction mixture having a composition in terms of mole ratios within the following ranges:

TABLE A

| Reactants | Embodiment 1 | Embodiment 2 |
|---|---|---|
| $YO_2/X_aO_b$ | 15-100 | 20-50 |
| $OH^-/YO_2$ | 0.10-1.0 | 0.30-0.80 |
| $Q/YO_2$ | 0.05-0.50 | 0.10-0.30 |
| $M_{2/n}/YO_2$ | 0.05-0.40 | 0.075-0.30 |
| $H_2O/YO_2$ | 10-70 | 25-50 | wherein Y is silicon, germanium or a mixture thereof; X is aluminum or a mixture of aluminum and iron, gallium, indium, and/or titanium; a is 1 or 2, b is 2 when a is 1 and b is 3 when a is 2; Q is cis-N,N-diethyldecahydroquinolinium cation SDA; M is an alkali metal cation, alkaline earth metal cation or mixtures thereof; and n is the valence of M.

Typical sources of aluminum oxide for the reaction mixture include aluminates, alumina, hydrated aluminum hydroxides, and aluminum compounds such as $AlCl_3$ and $Al_2(SO_4)_3$. Typical sources of silicon oxide include silica hydrogel, silicic acid, colloidal silica, tetraalkyl orthosilicates, silica hydroxides, and fumed silicas. Iron, gallium, indium, titanium, and germanium can be added in forms corresponding to their aluminum and silicon counterparts. Trivalent elements stabilized on silica colloids are also useful reagents.

A source zeolite reagent, such as Y zeolite, may provide a source of aluminum oxide. In most cases, the source zeolite also provides a source of silica. The source zeolite may also be used as a source of silica, with additional silicon added using, for example, the conventional sources listed above. Use of a source zeolite reagent for the present process is more completely described in U.S. Pat. No. 5,225,179, issued Jul. 6, 1993 to Nakagawa, entitled "Method of Making Molecular Sieves", the disclosure of which is incorporated herein by reference.

The SDA used to directly prepare the aluminum-containing SSZ-26 is a cis-N,N-diethyldecahydroquinolinium cation. The cation is associated with an anion which is not detrimental to the synthesis of the aluminum-containing SSZ-26. Examples of such anions include halogens (such as chloride, bromide or iodide), hydroxide, acetate, sulfate and carboxylate. Typically, the anion will be hydroxide. When the anion is hydroxide, it may be possible to reduce or eliminate alkali metal or alkaline earth metal hydroxide as a source of hydroxide in the reaction mixture.

The SDA may also be a mixture of cis-N,N-diethyldecahydroquinolinium cation and trans-N,N-diethyldecahydroquinolinium cation. The mixture may comprise 30 to 90 weight percent cis-N,N-diethyldecahydroquinolinium cation with the balance being trans-N,N-diethyldecahydroquinolinium cation. While not being bound by any theory, it is believed that there is a minimum amount of cis-N,N-diethyldecahydroquinolinium cation that must be present in the SDA to form the SSZ-26. If the ratio of cis to trans isomer is too low, SSZ-26 may not form. However, some amount of trans-N,N-diethyldecahydroquinolinium cation can be present in the mixture, in which case, it is believed the trans-N,N-diethyldecahydroquinolinium cation serves simply as a diluent.

The cis-N,N-diethyldecahydroquinolinium cation and trans-N,N-diethyldecahydroquinolinium cation have the following structures:

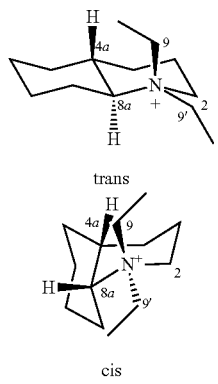

The general scheme for synthesizing the SDA is to use a source of decahydroquinoline that has an appreciable quantity (at least about 40%) of the cis isomer. This amine is then alkylated with an ethyl halide to give a quaternary ammonium salt. Decahydroquinoline is generally prepared by hydrogenation of quinoline with a metal or metal oxide catalyst. The nature of the catalyst will affect the cis/trans ratio of the final product.

In preparing the aluminum-containing molecular sieve SSZ-26, the reactants and the SDA are suspended or dissolved in water and the resulting reaction mixture (typically a gel) is maintained at an elevated temperature until crystals are formed. The temperatures during the hydrothermal crystallization step are typically maintained from about 100° C. to about 250° C., preferably from about 140° C. to about 200° C.

The crystallization period is typically about four days, and generally about one day to about seven days. In one embodiment, the crystallization period is about 72 hours or less, e.g., from about 24 to about 72 hours.

The hydrothermal crystallization is usually conducted under pressure and usually in an autoclave so that the reaction mixture is subject to autogenous pressure. The reaction mixture may be stirred during crystallization.

Once the crystals have formed, the solid product is separated from the reaction mixture by standard mechanical separation techniques, such as filtration. The crystals are water-washed and then dried, e.g., at 90° C. to 150° C. for from 8 to 24 hours, to obtain the as-synthesized crystals. The drying step can be performed at atmospheric or subatmospheric pressures.

During the hydrothermal crystallization step, the crystals can be allowed to nucleate spontaneously from the reaction mixture. The reaction mixture can also be seeded with crystals of SSZ-26 both to direct, and accelerate the crystallization, as well as to minimize the formation of any undesired crystalline phases. When seed crystals are used, typically about 0.5% to about 5.0% (based on the weight of silica used in the reaction mixture) of the seed crystals of the desired zeolite are added.

Due to the unpredictability of the factors which control nucleation and crystallization in the art of crystalline oxide synthesis, not every combination of reagents, reactant ratios, and reaction conditions will result in crystalline products. Selecting crystallization conditions which are effective for producing crystals may require routine modifications to the reaction mixture or to the reaction conditions, such as temperature, and/or crystallization time. Making these modifications are well within the capabilities of one skilled in the art.

The as-synthesized zeolite product made by the process of this invention has the X-ray diffraction lines of Table II and an as-synthesized composition comprising, in terms of mole ratios in the anhydrous state, the following:

| | |
|---|---|
| $YO_2/X_cO_d$ | greater than 15 |
| $Q/YO_2$ | 0.02-0.10 |
| $M_{2/n}/YO_2$ | 0.005-0.10 | wherein Y is silicon, germanium or a mixture thereof; X is aluminum or a mixture of aluminum and iron, gallium, indium, and/or titanium; Q is SDA; c is 1 or 2, d is 2 when c is 1 (i.e., X is tetravalent) or b is 3 or 5 when c is 2 (i.e., X is trivalent or pentavalent); M is ah alkali metal cation, alkaline earth metal cation or mixtures thereof; and n is the valence of M (i.e., 1 or 2). Preferably, Y is silicon, X is aluminum and M is sodium.

Typically, the molecular sieve is thermally treated (calcined) prior to use. Usually, it is desirable to remove the alkali or alkaline earth metal (if any) by ion exchange and replace it with hydrogen, ammonium, or any desired metal ion.

Usually, it is desirable to remove the alkali metal cation by ion exchange and replace it with hydrogen, ammonium, or any desired metal ion. The molecular sieve can be leached with chelating agents, e.g., EDTA or dilute acid solutions, to increase the silica/alumina mole ratio. The molecular sieve can also be steamed; steaming helps stabilize the crystalline lattice to attack from acids. The zeolite can be used in intimate combination with hydrogenating components, such as tungsten, vanadium molybdenum, rhenium, nickel cobalt, chromium, manganese, or a noble metal, such as palladium or platinum, for those applications in which a hydrogenation-dehydrogenation function is desired. Typical replacing cations can include hydrogen and hydrogen precursors, rare earth metals, and metals from Groups IIA, IIIA, IVA, IB, IIB, IIIB, IVB, VIB, and VIII of the Periodic Table of Elements. Of the replacing cations, hydrogen and cations of metals such as rare earth, Mn, Ca, Mg, Zn, Cd, Pt, Pd, Ni, Co, Ti, Al, Sn, Ga, In and Fe are particularly preferred.

The X-ray powder diffraction patterns were determined by standard techniques. The radiation was CuKalpha. The peak areas I and the positions, as a function of 2Theta where Theta is the Bragg angle, were determined from the relative intensities, 100×I/I$_o$ where I$_o$ is the integrated intensity of the strongest line or peak, and d, the interplanar spacing in Angstroms corresponding to the recorded lines, can be calculated.

The X-ray diffraction pattern of Table I is representative of an as-synthesized aluminum-containing molecular sieve SSZ-26 (i.e., the SDA has not yet been removed from the molecular sieve) made in accordance with this disclosure. Minor variations in the diffraction pattern can result from variations in the silica-to-alumina mole ratio of the particular sample due to changes in lattice constants. In addition, sufficiently small crystals will affect the shape and intensity of peaks, leading to significant peak broadening. The variation in the scattering angle (two theta) measurements, due to instrument error and to differences between individual samples, is estimated at +/−0.10 degrees.

TABLE I

AS-SYNTHESIZED ALUMINUM-CONTAINING SSZ-26

| 2 Theta | d-space (Angstroms) | I/Io × 100 |
|---|---|---|
| 7.69 | 11.49 | 79.2 |
| 8.36 | 10.57 | 0.9 |
| 8.97 | 9.85 | 14.9 |
| 9.65 | 9.16 | 2.3 |
| 13.19 | 6.71 | 29.5 |
| 14.16 | 6.25 | 11.9 |
| 15.08 | 5.87 | 12.5 |
| 15.48 | 5.72 | 8.8 |
| 15.73 | 5.63 | 8.5 |
| 15.94 | 5.56 | 2.9 |
| 16.81 | 5.27 | 7.8 |
| 18.16 | 4.88 | 8.4 |
| 19.48 | 4.55 | 25.8 |
| 20.01 | 4.43 | 69.9 |
| 20.67 | 4.29 | 7.7 |
| 21.31 | 4.17 | 24.5 |
| 22.07 | 4.02 | 71.5 |
| 22.67 | 3.92 | 33.5 |
| 22.91 | 3.88 | 100 |
| 23.39 | 3.8 | 2.1 |
| 25.01 | 3.56 | 11.2 |
| 25.35 | 3.51 | 4.1 |
| 25.68 | 3.47 | 2.5 |
| 26.2 | 3.4 | 47.2 |
| 26.52 | 3.36 | 5.2 |
| 27.73 | 3.21 | 6.7 |
| 28.61 | 3.12 | 13.7 |
| 28.93 | 3.08 | 11.3 |
| 29.46 | 3.03 | 6.6 |
| 30.29 | 2.95 | 15.6 |
| 30.77 | 2.9 | 2.6 |
| 31.31 | 2.85 | 11 |
| 31.81 | 2.81 | 7.1 |
| 33.29 | 2.69 | 12.9 |
| 34.07 | 2.63 | 0.8 |
| 35.1 | 2.55 | 10.8 |

TABLE I-continued

AS-SYNTHESIZED ALUMINUM-CONTAINING SSZ-26

| 2 Theta | d-space (Angstroms) | I/Io × 100 |
|---|---|---|
| 35.42 | 2.53 | 3 |
| 36 | 2.49 | 2.3 |

The X-ray diffraction pattern of Table II shows the major peaks of a calcined aluminum-containing molecular sieve SSZ-26, in the anhydrous state, made in accordance with this disclosure.

TABLE II

CALCINED ALUMINUM-CONTAINING SSZ-26

| 2 Theta | d-space | I/Io × 100 |
|---|---|---|
| 7.74 | 11.41 | 100 |
| 8.33 | 10.61 | 1.1 |
| 8.98 | 9.84 | 22.6 |
| 13.12 | 6.74 | 16.8 |
| 14.11 | 6.27 | 5.4 |
| 14.5 | 6.1 | 0.9 |
| 15.21 | 5.82 | 3.6 |
| 15.55 | 5.69 | 4.6 |
| 16.69 | 5.31 | 3.9 |
| 18.16 | 4.88 | 1.2 |
| 19.61 | 4.52 | 9.9 |
| 20.17 | 4.4 | 37.9 |
| 20.75 | 4.28 | 3.2 |
| 21.3 | 4.17 | 13.2 |
| 21.94 | 4.05 | 37.2 |
| 22.84 | 3.89 | 25.8 |
| 23.04 | 3.86 | 47.3 |
| 23.46 | 3.79 | 1.4 |
| 25.19 | 3.53 | 11.6 |
| 25.71 | 3.46 | 3.2 |
| 26.42 | 3.37 | 34 |
| 27.64 | 3.22 | 3.4 |
| 27.91 | 3.19 | 2.5 |
| 28.48 | 3.13 | 7.3 |
| 28.91 | 3.09 | 10.1 |
| 29.62 | 3.01 | 6.2 |
| 30.4 | 2.94 | 7.8 |
| 30.85 | 2.9 | 1.7 |
| 31.42 | 2.84 | 3.4 |
| 31.97 | 2.8 | 2.1 |
| 33.3 | 2.69 | 8.8 |
| 34.81 | 2.58 | 0.6 |
| 35.34 | 2.54 | 5.3 |
| 35.61 | 2.52 | 1.9 |

Calcination can also result in changes in the intensities of the peaks as well as minor shifts in the diffraction pattern. The molecular sieve produced by exchanging the metal or other cations present in the zeolite with various other cations (such as H$^+$ or NH$_4^+$) yields essentially the same diffraction pattern, although again, there may be minor shifts in the interplanar spacing and variations in the relative intensities of the peaks. Notwithstanding these minor perturbations, the basic crystal lattice remains unchanged by these treatments.

The aluminum-containing molecular sieve SSZ-26 prepared by the present process is useful in hydrocarbon conversion reactions. Hydrocarbon conversion reactions are chemical and catalytic processes in which carbon-containing compounds are changed to different carbon-containing compounds. Examples of hydrocarbon conversion reactions include catalytic cracking, hydrocracking, dewaxing, alkylation, isomerization, olefin and aromatics formation reactions, and aromatics isomerization and disproportionation.

Aluminum-containing SSZ-26 can also be used in an adsorbent bed to reduce cold start emissions from the exhaust stream of an internal combustion engine when the engine is first started. The adsorbent bed preferentially adsorbs hydrocarbons over water under the conditions present in the exhaust stream. After a certain amount of time, the adsorbent bed has reached a temperature (typically about 150° C.) at which the bed is no longer able to remove hydrocarbons from the exhaust stream. That is, hydrocarbons are actually desorbed from the adsorbent bed instead of being adsorbed. This regenerates the adsorbent bed so that it can adsorb hydrocarbons during a subsequent cold start. Reduction of cold start emissions is disclosed in U.S. Pat. No. 5,078,979, issued Jan. 7, 1992 to Dunne, which is incorporated herein by reference in its entirety.

Aluminum-containing SSZ-26 can be used for the catalytic reduction of the oxides of nitrogen in a gas stream. Typically, the gas stream also contains oxygen, often a stoichiometric excess thereof. Also, the molecular sieve may contain a metal or metal ions within or on it which are capable of catalyzing the reduction of the nitrogen oxides. Examples of such metals or metal ions include cobalt, copper, platinum, iron, chromium, manganese, nickel, zinc, lanthanum, palladium, rhodium and mixtures thereof.

One example of such a process for the catalytic reduction of oxides of nitrogen in the presence of a zeolite is disclosed in U.S. Pat. No. 4,297,328, issued Oct. 27, 1981 to Ritscher et al., which is incorporated by reference herein. There, the catalytic process is the combustion of carbon monoxide and hydrocarbons and the catalytic reduction of the oxides of nitrogen contained in a gas stream, such as the exhaust gas from an internal combustion engine. The zeolite used is metal ion-exchanged, doped or loaded sufficiently so as to provide an effective amount of catalytic copper metal or copper ions within or on the zeolite. In addition, the process is conducted in an excess of oxidant, e.g., oxygen.

The following examples demonstrate, but do not limit, the present invention.

EXAMPLES

Example 1

Synthesis of Decahydroquinoline 200 mL glacial acetic acid, 15 mL concentrated sulfuric acid, and 152 g quinoline (1.18 mol) were added to a large stainless steel reactor equipped with a hydrogen flow. Next 15 g of platinum oxide catalyst was added to the mixture. The reaction vessel was then sealed and pressurized and depressurized three times with dry nitrogen. At the end of each depressurization step, the pressure in the reactor vessel was maintained above atmospheric pressure. The reactor was then pressurized with hydrogen gas to 1500 psi and then depressurized to just above atmospheric pressure twice. The vessel was then pressurized to 1500 psi hydrogen. After a few hours, the pressure dropped to 400 psi and the reactor vessel was then pressurized again with hydrogen to 1500 psi. After an additional two hours, the pressure again dropped to about 400 psi. The vessel was again pressurized with hydrogen to 1500 psi, and the reaction was allowed to continue overnight. At the end of the reaction, the pressure was constant at about 1400 psi.

At this point, the contents of the reactor were removed and the platinum oxide catalyst was removed by filtration. About 300 mL water was then added to the filtrate solution and then NaOH pellets were added and dissolved in the solution until the pH>12. An organic layer was observed above the aqueous solution upon the increase in pH. The organic product was then extracted from the mixture using ethyl ether. The ether solution was then dried over magnesium sulfate, and the ether was removed by rotoevaporation to yield the desired decahydroquinoline. $^1$H and $^{13}$C liquid NMR indicated the decahydroquinoline product was pure within experimental limits and that it possessed about a 60/40 trans/cis ratio of isomers.

Next, a fraction of the decahydroquinoline product was placed in a round-bottom flask and the flask was then cooled with dry ice until the amine had completely frozen. At this point, the flask was removed from the dry ice and then tilted slightly on its side. Part of the solid then began to thaw. After the mixture had warmed, two separate fractions were formed: a liquid fraction which collected on the bottom of the flask and a mostly solid fraction on the side of the flask. The solid fraction was still slightly wet. NMR of the two fractions indicated the liquid fraction was about 45/55 trans/cis and the solid fraction was about 75/25 trans/cis.

Example 2

Synthesis of N,N-Diethyldecahydroquinolinium

In a 500 mL round-bottom flask, 33.2 g (0.24 mol) of the liquid decahydroquinoline fraction was mixed with 228 mL methanol. 34.8 g potassium bicarbonate (0.35 mol) was then added, and a magnetic stirrer was added to the mixture to allow mixing in the subsequent steps. Next, 90.2 g iodoethane (0.58 mol) was added dropwise. After allowing the mixture to stir at room temperature for two hours, the mixture was refluxed overnight. The mixture was then allowed to cool to room temperature, and the potassium salts were removed by filtration. The filtrate was then rotoevaporated to remove the methanol solvent. The resulting solids were then extracted with chloroform, and the product was recovered by rotoevaporation of the chloroform.

The residues were then dissolved in isopropanol and the product was precipitated as a solid with the addition of an excess of ethyl ether. The solids were then collected by filtration and washed with ethyl ether. The solids were then slurried in acetone, and the acetone was removed by filtration. The acetone in the filtrate was then removed by rotoevaporation to yield an oil. Addition of 50 mL acetone and excess ether caused precipitation of solid product. The product was recrystallized by dissolving the solids in a minimum of hot methanol, adding some ethyl acetate, and rotoevaporating to remove a small amount of the methanol until a trace of solid was observed to precipitate. The recrystallization was then allowed to occur for two days at 0 C. NMR of the separate solid fractions indicated the solid which did not dissolve in the acetone is about 100% trans, and the component recovered from the acetone is about 80/20 cis/trans. This indicates the cis isomer easily dissolves in acetone, while the trans isomer possesses limited solubility in acetone.

Comparative Example A

Synthesis with Pure Trans-Isomer of N,N-Diethyldecahydroquinolinium 1.1 g deionized water, 3 g 1 N NaOH, and 5.65 g of a hydroxide solution of the trans N,N-diethyldecahydroquinolinium (0.60 mmol/g) were mixed together in a 23 mL Teflon liner. To this were added 0.8 g Cabosil M-5 fumed silica and 0.25 g zeolite Y (LZY-62). The resulting get was mixed to give a uniform suspension. The Teflon liner was then capped and sealed within a Parr autoclave. The autoclave was then attached to a rotating (43 rpm) spit within an oven at 160° C. After 7 days in the oven, the Parr bomb was removed and allowed to cool to room temperature. The solids were then removed by filtration and washed with at least 500 mL deionized water. After the resulting powder was allowed to dry overnight, powder XRD analysis was performed on the sample. XRD analysis indicated the sample was mostly zeolite Y and cristobalite.

Example 3

Synthesis of SSZ-26 with Pure 3:1 Ratio of Cis/Trans N,N-Diethyldecahydroquinolinium 8.96 g of a hydroxide solution of cis-N,N-diethyldecahydroquinolinium (0.28 mmol/g), 1.39 g of a hydroxide solution trans-N,N-diethyldecahydroquinolinium (0.60 mmol/g), 3 g 1N NaOH were added to 23 mL Teflon liner. The mixture was then placed in vented fume hood to allow some of the water to evaporate. The total mass of the mixture was then adjusted to 10.8 g with the addition of deionized water. Then 0.80 g Cabosil M-5 and 0.25 g zeolite Y (LZY-62) were thoroughly mixed to create a uniform suspension. The mixture was then heated as in Comparative Example A. After 7 days, the crystallized solids were recovered by filtration (0.86 g product). XRD analysis indicated the product was pure SSZ-26.

Example 4

Synthesis with Pure 1:1 Ratio of Cis/Trans N,N-Diethyldecahydroquinolinium

The procedure of Example 3 was repeated except 5.98 g cis-N,N-diethyldecahydroquinolinium (0.28 mmol/g) and 2.80 g trans-N,N-diethyldecahydroquinolinium were used. After 7 days, the powder sample (0.87 g) was recovered and XRD analysis indicated the product to be pure SSZ-26.

Comparative Example B

Synthesis with Pure 1:3 Ratio of Cis/Trans N,N-Diethyldecahydroquinolinium

The procedure of Example 3 was repeated except 2.99 g cis-N,N-diethyldecahydroquinolinium (0.28 mmol/g) and 4.19 g trans-N,N-diethyldecahydroquinolinium were used. After 7 days, the product was recovered. XRD analysis indicated the product was zeolite Y and cristobalite.

Example 5

Synthesis of SSZ-26 with Pure 38:62 Ratio of Cis/Trans N,N-Diethyldecahydroquinolinium In a 1-liter Teflon-liner were placed 52.7 g deionized water, 156.4 g of a hydroxide solution of an 80/20 cis/trans mixture of N,N-diethyldecahydroquinolinium (0.49 mmol/g), 102.5 g of a hydroxide solution of pure trans N,N-diethyldecahydroquinolinium, and 138.6 g 1 N NaOH. Next 36.96 g Cabosil M-5 was mixed with the solution to create a uniform suspension. 11.8 g zeolite Y (LZY-62) were thoroughly mixed into the resulting gel and 0.82 g SSZ-26 seeds (as prepared in (4)) were added. The liner was then placed within a 1-liter stainless steel reactor vessel equipped with a paddle stirrer and sealed. The vessel was then heated from room temperature to 170° C. in an 8-hour ramping sequence. After four days, the reaction was stopped and the crystallized solids were removed by filtration and washed with two liters of deionized water. Powder XRD indicated the sample was pure SSZ-26.

Example 6

Synthesis of SSZ-26 with Pure 38:62 Ratio of Cis/Trans N,N-Diethyldecahydroquinolinium at Higher SAR (SAR=46)

In a 1-liter Teflon-liner were placed 40.4 g deionized water, 120.0 g of a hydroxide solution of an 80/20 cis/trans mixture of N,N-diethyldecahydroquinolinium (0.49 mmol/g), 78.6 g of a hydroxide solution of pure trans N,N-diethyldecahydroquinolinium, and 106.3 g 1 N NaOH. Next 30.1 g Cabosil M-5 was mixed with the solution to create a uniform suspension. 6.8 g zeolite Y (LZY-62) were thoroughly mixed into the resulting gel and 0.63 g SSZ-26 seeds (as prepared in Example 3) were added. The gel was then heated as described in Example 5. After three days at 170° C., XRD analysis indicated the sample was SSZ-26 with quartz impurity.

For the purposes of this specification and appended claims, unless otherwise indicated, all numbers expressing quantities, percentages or proportions, and other numerical values used in the specification and claims, are to be understood as being modified in all instances by the term "about." Furthermore, all ranges disclosed herein are inclusive of the endpoints and are independently combinable.

All of the publications, patents and patent applications cited in this application are herein incorporated by reference in their entirety to the same extent as if the disclosure of each individual publication, patent application or patent was specifically and individually indicated to be incorporated by reference in its entirety.

This written description uses examples to disclose the invention, including the best mode, and also to enable any person skilled in the art to make and use the invention. Many modifications of the exemplary embodiments of the invention disclosed above will readily occur to those skilled in the art. Accordingly, the invention is to be construed as including all structure and methods that fall within the scope of the appended claims.

What is claimed is:

1. A process for preparing aluminum-containing molecular sieve SSZ-26, said process comprising:
    (a) preparing an aqueous suspension from (1) sources of an alkali metal oxide, alkaline earth metal oxide or mixtures thereof; (2) sources of an oxide selected from the oxides of aluminum, or mixtures of oxides of aluminum and iron, gallium, indium, and/or titanium; (3) sources of an oxide selected from oxides of silicon, germanium or mixtures thereof; and (4) a structure directing agent comprising a cis-N,N-diethyldecahydroquinolinium cation;
    (b) maintaining the aqueous suspension under conditions sufficient to form crystals of the molecular sieve.

2. The process of claim 1 wherein said aqueous suspension comprises, in terms of mole ratios, the following:

| | |
|---|---|
| $YO_2/X_aO_b$ | 15-100 |
| $OH^-/YO_2$ | 0.10-1.0 |
| $Q/YO_2$ | 0.05-0.50 |
| $M_{2/n}/YO_2$ | 0.05-0.40 |
| $H_2O/YO_2$ | 10-70 | wherein Y is silicon, germanium or a mixture thereof; X is aluminum or a mixture of aluminum and iron, gallium, indium, and/or titanium; a is 1 or 2, b is 2 when a is 1 and b is 3 when a is 2; Q comprises a cis-N,N-diethyldecahydroquinolinium cation; M is an alkali metal cation, alkaline earth metal cation or mixtures thereof; and n is the valence of M.

3. The process of claim 2 wherein said aqueous suspension comprises, in terms of mole ratios, the following:

| | |
|---|---|
| $YO_2/X_aO_b$ | 20-50 |
| $OH^-/YO_2$ | 0.30-0.80 |
| $Q/YO_2$ | 0.10-0.30 |
| $M_{2/n}/YO_2$ | 0.075-0.30 |
| $H_2O/YO_2$ | 25-50. |

4. The process of claim 3 wherein Q comprises a mixture of a cis-N,N-diethyldecahydroquinolinium cation and a trans-N,N-diethyldecahydroquinolinium cation.

5. The process of claim 4 wherein the mixture comprises about 30 to about 90 mole percent cis-N,N-diethyldecahydroquinolinium cation.

6. The process of claim 2 wherein Q comprises a mixture of a cis-N,N-diethyldecahydroquinolinium cation and a trans-N,N-diethyldecahydroquinolinium cation.

7. The process of claim 6 wherein the mixture comprises about 30 to about 90 mole percent cis-N,N-diethyldecahydroquinolinium cation.

8. The process of claim 2 wherein Y is silicon and X is aluminum.

9. The process of claim 1 wherein the structure directing agent comprises a mixture of a cis-N,N-diethyldecahydroquinolinium cation and a trans-N,N-diethyldecahydroquinolinium cation.

10. The process of claim 9 wherein the mixture comprises about 30 to about 90 mole percept cis-N,N-diethyldecahydroquinolinium cation.

11. The process of claim 1 further comprising replacing the alkali metal cations, alkaline earth metal cations, or both of the molecular sieve, at least in part, by ion exchange with a cation or mixture of cations selected from the group consisting of hydrogen and hydrogen precursors, rare earth metals, and metals from Groups IIA, IIIA, IVA, IB, IIB, IIIB, IVB, VIB, and VIII of the Periodic Table of Elements.

12. The process of claim 11 wherein said replacing cation is hydrogen or a hydrogen precursor.

13. An aluminum-containing molecular sieve SSZ-26 composition, as-synthesized and in the anhydrous state whose composition, in terms of mole ratios, is as follows:

| | |
|---|---|
| $YO_2/X_cO_d$ | greater than 15 |
| $Q/YO_2$ | 0.02-0.10 |
| $M_{2/n}/YO_2$ | 0.005-0.10 | wherein Y is silicon, germanium or a mixture thereof; X is aluminum or a mixture of aluminum and iron, gallium, iridium, and/or titanium; c is 1 or 2, d is 2 when c is 1 or b is 3 or 5 when c is 2; Q comprises a cis-N,N-diethyldecahydroquinolinium cation; M is an alkali metal cation, alkaline earth metal cation or mixtures thereof; and n is the valence of M.

14. The composition of claim 13 wherein Y is silicon and X is aluminum.

15. The composition of claim 13 wherein Q comprises a mixture of a cis-N,N-diethyldecahydroquinolinium cation and a trans-N,N-diethyldecahydroquinolinium cation.

16. The composition of claim 15 wherein the mixture comprises about 30 to about 90 mole percent cis-N,N-diethyldecahydroquinolinium cation.

* * * * *